(12) United States Patent
Lee et al.

(10) Patent No.: US 11,637,963 B2
(45) Date of Patent: Apr. 25, 2023

(54) IMAGE SENSOR AND IMAGE PROCESSING SYSTEM COMPRISING THE SAME

(71) Applicant: SAMSUNG ELECTRONICS CO., LTD., Suwon-si (KR)

(72) Inventors: Jeongguk Lee, Seoul (KR); Yunseok Choi, Seoul (KR); Dochang Ahn, Suwon-si (KR); Sunghyuk Yim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 16/923,569

(22) Filed: Jul. 8, 2020

(65) Prior Publication Data

US 2021/0021751 A1 Jan. 21, 2021

(30) Foreign Application Priority Data

Jul. 16, 2019 (KR) .................. 10-2019-0085823
Nov. 18, 2019 (KR) .................. 10-2019-0148086

(51) Int. Cl.
| | | |
|---|---|---|
| *H04N 5/235* | (2006.01) | |
| *H04N 5/265* | (2006.01) | |
| *G06T 5/50* | (2006.01) | |
| *H04N 19/184* | (2014.01) | |
| *H04N 5/355* | (2011.01) | |
| *H04N 19/85* | (2014.01) | |

(52) U.S. Cl.
CPC ............ *H04N 5/2355* (2013.01); *G06T 5/50* (2013.01); *H04N 5/2353* (2013.01); *H04N 5/265* (2013.01); *H04N 5/35536* (2013.01); *H04N 19/184* (2014.11); *H04N 19/85* (2014.11); *G06T 2207/20208* (2013.01); *G06T 2207/20221* (2013.01)

(58) Field of Classification Search
CPC .... H04N 5/2355; H04N 5/2353; H04N 5/265; H04N 19/184; H04N 1/407; H04N 5/35581; H04N 19/42; H04N 19/85; H04N 5/35536; G06T 5/50; G06T 2207/20208; G06T 2207/20221
See application file for complete search history.

(56) References Cited

U.S. PATENT DOCUMENTS

| | | |
|---|---|---|
| 8,248,486 B1 | 8/2012 | Ward et al. |
| 8,477,212 B2 | 7/2013 | Oyabu et al. |
| 8,687,087 B2 | 4/2014 | Pertsel et al. |
| 9,275,445 B2 | 3/2016 | Granados et al. |
| 9,451,173 B2 | 9/2016 | Kang et al. |
| 9,535,489 B2 | 1/2017 | Ju et al. |
| 9,538,092 B2 | 1/2017 | Mody et al. |

(Continued)

FOREIGN PATENT DOCUMENTS

KR 100763656 B1 10/2007

*Primary Examiner* — Quan Pham
(74) *Attorney, Agent, or Firm* — Sughrue Mion, PLLC

(57) ABSTRACT

An image sensor and an image processing system in which the image sensor includes a sensing unit configured to generate a plurality of images having different luminances with respect to a same object, a pre-processor configured to merge n images (n is a natural number equal to or greater than 2) except for at least one of the plurality of images to generate a merged image, and an interface circuit configured to output the at least one image and the merged image to an external processor.

18 Claims, 15 Drawing Sheets

(56) References Cited

U.S. PATENT DOCUMENTS

| | | |
|---|---|---|
| 10,136,080 B2 | 11/2018 | Nishikawa et al. |
| 10,158,809 B2 | 12/2018 | Shibata et al. |
| 2004/0135903 A1 | 7/2004 | Brooks et al. |
| 2013/0202202 A1* | 8/2013 | Hasu .................... G06T 3/4053 |
| | | 382/166 |
| 2018/0167544 A1* | 6/2018 | Jeong ................ H04N 5/35581 |
| 2018/0276783 A1 | 9/2018 | Yasuda |

* cited by examiner

IMAGE SENSOR AND IMAGE PROCESSING SYSTEM COMPRISING THE SAME

CROSS-REFERENCE TO RELATED APPLICATIONS

This application claims the benefit of Korean Patent Application Nos. 10-2019-0085823 and 10-2019-0148086, filed on Jul. 16, 2019, and Nov. 18, 2019, respectively, in the Korean Intellectual Property Office, the disclosures of which are herein incorporated by reference in their entireties.

BACKGROUND

The disclosure relates to image processing, and more particularly, to an image sensor for pre-processing an input image for extending the dynamic range of an output image and an image processing system including the image sensor.

An image processing system such as a camera may include an image sensor that converts an optical signal incident through an optical lens into an image, and a processor that performs image processing on the generated image. Thereby, an object in the image may be captured. The range of luminance that the image sensor may accommodate is narrower than that of luminance that the human eyes may accommodate. Therefore, an image captured may be different from an actual image seen by the human eyes. For example, when capturing an image in an environment in which backlighting is present, the background may be too bright and the object may appear too dark. Accordingly, the high dynamic range (HDR) technique of capturing the same object at different exposure times, generating a plurality of images having different exposure times, and performing image processing on the plurality of images to extend the dynamic ranges of the images is used.

SUMMARY

The disclosure provides an image sensor for increasing the dynamic range of an image output by an image processing system through pre-processing of images. Similarly, the disclosure provides an image processing system including the image sensor.

According to an aspect of an embodiment, there is provided an image sensor including a sensing unit configured to generate a first image of an object, a second image of the object, and a third image of the object, the first image having a first luminance, the second image having a second luminance, and the third image having a third luminance, wherein the first luminance, the second luminance, and the third luminance are different from each other; a pre-processor configured to merge the first image and the second image to generate a merged image; and an interface circuit configured to output the third image and the merged image to an external processor.

According to another aspect of an embodiment, there is provided an image processing system including an image sensor configured to generate a first image based on a first exposure time, a second image based on a second exposure time, and a third image based on a third exposure time, wherein the first exposure time, the second exposure time, and the third exposure time are different from each other, merge the first image and the second image to generate a merged image, output first image data based on the merged image and second image data based on the third image; and an image processor configured to receive the first image data and the second image data and generate a high dynamic range (HDR) image having an increased dynamic range based on the first image, the second image, and the third image using the first image data and the second image data.

According to another aspect of the inventive concept, there is provided an image processing system including a pixel array configured to convert optical signals incident thereon into electrical signals based on different exposure times; a readout circuit configured to generate a first exposure image having a first exposure time, a second exposure image having a second exposure time, and a third exposure image having a third exposure time based on the electrical signals, wherein the first exposure time is a longest exposure time among the first exposure time, the second exposure time, and the third exposure time, and wherein the third exposure time is a shortest exposure time among the first exposure time, the second exposure time, and the third exposure time, a readout circuit configured to generate a first exposure image having a first exposure time, a second exposure image having a second exposure time, and a third exposure image having a third exposure time based on the electrical signals, wherein the first exposure time is a longest exposure time among the first exposure time, the second exposure time, and the third exposure time, and wherein the third exposure time is a shortest exposure time among the first exposure time, the second exposure time, and the third exposure time, a pre-processor configured to generate a merged image based on the second exposure image and the third exposure image, and an interface circuit configured to output the first exposure image and the merged image to an external processor.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Various embodiments are described below in connection with the accompanying drawings.

Figure 1:
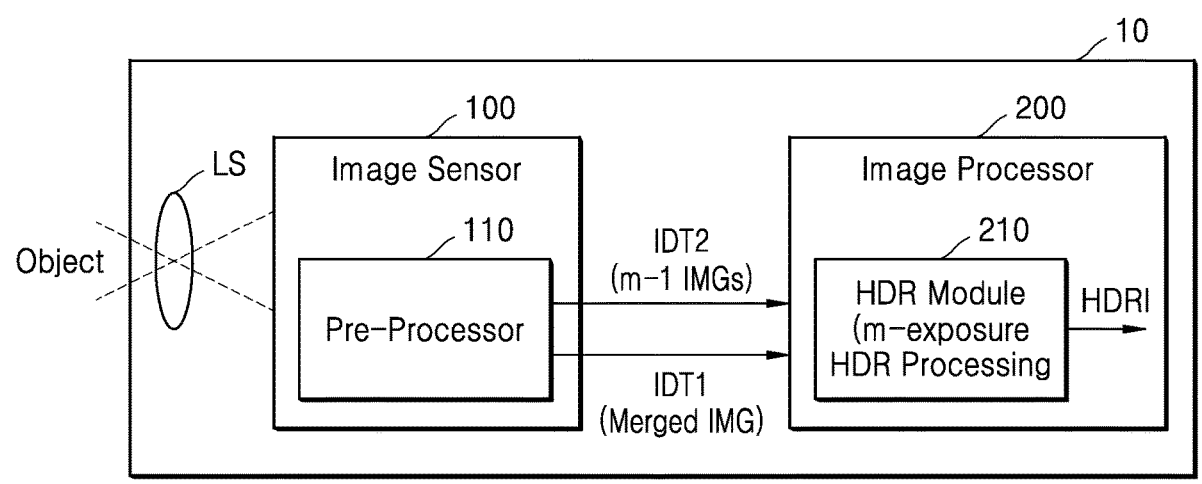
FIG. 1 is a block diagram illustrating an image processing system according to an embodiment.

FIG. 1 is a block diagram illustrating an image processing system according to an embodiment.

The image processing system 10 may be embedded in or implemented as an electronic device. The electronic device is a device that captures an image, displays a captured image, or performs an operation based on the captured image. The electronic device may include, for example, a digital camera, a smartphone, a wearable device, and an Internet of Things (IoT) device, a personal computer (PC), a tablet PC, a personal digital assistant (PDA), a portable multimedia player (PMP), a navigation device, a drone, and the like, or may be mounted on an electronic device provided as a component in a vehicle, a medical device, furniture, manufacturing facility, a security device, a door, various measuring devices, and the like.

Referring to FIG. 1, the image processing system 10 may include an image sensor 100 and an image processor 200. The image processing system 10 may further include other components, such as a display, a user interface, and the like. The image sensor 100 may include a pre-processor 110, and the image processor 200 may include a high dynamic range (HDR) module 210 that performs HDR processing.

The image sensor 100 may convert an optical signal representative of an object incident thereon through an optical lens LS into an electrical signal, and generate an image based on the electrical signal. The image sensor 100 may generate a plurality of images having different luminance with respect to the same object. For example, the image sensor 100 may generate multiple exposure images by capturing the same object based on different exposure times. Alternatively, when a plurality of photoelectric conversion elements are provided in each of pixels of a pixel array (120 of FIG. 2), the image sensor 100 may adjust the number of photoelectric conversion elements used for image sensing to generate a plurality of images having different luminances.

The pre-processor 110 may merge two or more images among the plurality of images having different luminances to generate a merged image. In an embodiment, the pre-processor 110 may perform linearization processing on some images to generate a merged image with an increased dynamic range compared to each of the some images. Linearization processing refers to a processing method of matching the brightness of at least two images with different brightness ranges and selecting a pixel value of an image that is more appropriate for a particular area where the brightness increases (or decreases) nonlinearly, or performing calculation based on pixel values of at least two images to linearly increase (or decrease) the brightness. Linearization processing may increase the dynamic range of the image, and increase the number of bits of each pixel value of the image.

The image sensor 100 may transmit the merged image as a first image data IDT1 to the image processor 200, and transmit at least one image except for some images on which linearization processing is performed among the plurality of images as a second image data IDT2 to the image processor 200. In an embodiment, the image sensor 100 may compress the merged image and transmit the compressed (merged) image as the second image data IDT2 to the image processor 200.

The image processor 200 may perform image processing based on the first image data IDT1 and the second image data IDT2. The image processing may include various image processing techniques for improving image quality. For example, the image processing techniques may include noise reduction, brightness adjustment, sharpness adjustment, image processing for changing an image size, image processing for changing a data format of the image data of the image (e.g., changing Bayer pattern image data in YUV or RGB format), and the like.

The HDR module 210 may perform HDR processing on the first image data IDT1 and the second image data IDT2 received from the image sensor 100, for example, the merged image of the first image data IDT1 and at least one image on which linearization processing is not performed of the second image data IDT2. In an embodiment, when the compressed (merged) image is received from the image sensor 100 as the first image data IDT1, the image processor 200 may de-compress the compressed image, and the HDR module 210 may perform HDR processing on the decompressed merged image and the at least one image that are reconstructed by decompression.

The HDR processing may include linearization processing and dynamic range compression (DRC) processing. The DRC processing may include tone mapping (e.g., gamma correction). For example, a relatively bright area of the image may be corrected to decrease the brightness or increase the darkness thereof, and a dark area may be corrected to decrease the darkness or increase the brightness thereof, according to tone mapping. As HDR processing is performed on the merged image and the at least one image, an HDR image HDRI having an increased dynamic range and an improved signal to noise ratio (SNR) may be generated and output by the image processing system 10. The various kinds of image processing described above may be performed on the HDR image HDRI. However, the embodiment is not limited thereto, and at least one of the various image processing may be performed during HDR processing.

In an embodiment, the quantity of images on which the HDR module 210 may perform HDR processing may be less than the quantity of images generated by the image sensor 100. For example, the HDR module 210 may perform HDR processing on m exposure images (m is a natural number equal to or greater than 2), and the image sensor 100 may generate k exposure images (k is a natural number greater than m). Although the k exposure images are received from the image sensor 100, the HDR module 210 may perform HDR processing on a subset of the m exposure images from among the k exposure images. However, the image sensor 100 according to an embodiment may merge some exposure images of the k exposure images and transmit the merged image IMG and m−1 (or less than m−1) remaining exposure images m−1 IMGs to the image processor 200. As a result, the HDR module 210 may perform HDR processing on only the received m images. One image on which HDR processing is performed by the HDR module 210, that is, the merged image, is an image on which image linearization processing is performed by the image sensor 100. Accordingly, the HDR image HDRI generated by the HDR module 210 may have the same or similar dynamic range and SNR as the k exposure images on which HDR processing is performed.

In an embodiment, the HDR module 210 may perform real-time HDR processing. The HDR module 210 may perform real-time HDR processing on the merged image and the at least one image on which linearization processing is not performed that are received in a staggered manner in a unit of lines. Accordingly, the generated HDR image HDRI may be output as one frame of a preview image and a video to a preview screen of the image processing system 10 to assist a user of the image processing system 10 during capturing of images.

The image processor 200 may be implemented in hardware, software (or firmware), or a combination of hardware and software. The image processor 200 may be implemented as one of various kinds of processors capable of performing image processing, such as a graphics processing unit (GPU), a digital signal processor (DSP), and an image signal processor (ISP). The image processor 200 may be implemented as a single chip or embedded in an application processor (AP), microprocessor, or a system on chip.

When linearization processing and DRC processing included in HDR processing are performed by either the image sensor 100 or the image processor 200, the dynamic range of the HDR image HDRI may be determined according to the specification that a component controlling the processing is capable of performing processing. For example, when linearization and DRC processing are performed by the HDR module 210 of the image processor 200, the dynamic range of the HDR image HDRI may be determined according to the processing specifications of the HDR module 210 included in the image processor 200. As another example, linearization processing may be performed on the plurality of images by the image sensor 100 and DRC processing may be performed on the plurality of images by the image processor 200, or both linearization and DRC processing may be performed on the plurality of images by the image sensor 100. In this regard, the dynamic range of the HDR image HDRI may be determined according to the processing specifications of the image sensor 100 or the bandwidth of a data communication channel between the image sensor 100 and the image processor 200.

However, in the image processing system 10 according to an embodiment, as described above, the pre-processor 110 of the image sensor 100 may perform pre-processing. For example, the pre-processor 110 may perform linearization processing on some of the plurality of images, and the HDR module 210 of the image processor 200 may perform HDR processing. For example, the HDR module 210 may perform linearization processing and DRC processing on both the image (i.e., the merged image) on which pre-processing is performed and the at least one image on which pre-processing is not performed, which are both received from the image sensor 100. Accordingly, the HDR image HDRI having a greater dynamic range than the dynamic range that may be processed by the HDR module 210 may be generated. In addition, because the pre-processor 110 of the image sensor 100 performs linearization processing on some images, the load of the image processor 200 for HDR processing may be reduced, and the HRD processing speed of the image processing system 10 may be improved. In particular, when the image processing system 10 performs HDR processing, that is, real-time HDR processing, to generate a preview image and a video image, the performance of the image processing system 10 may also be improved.

Figure 2:
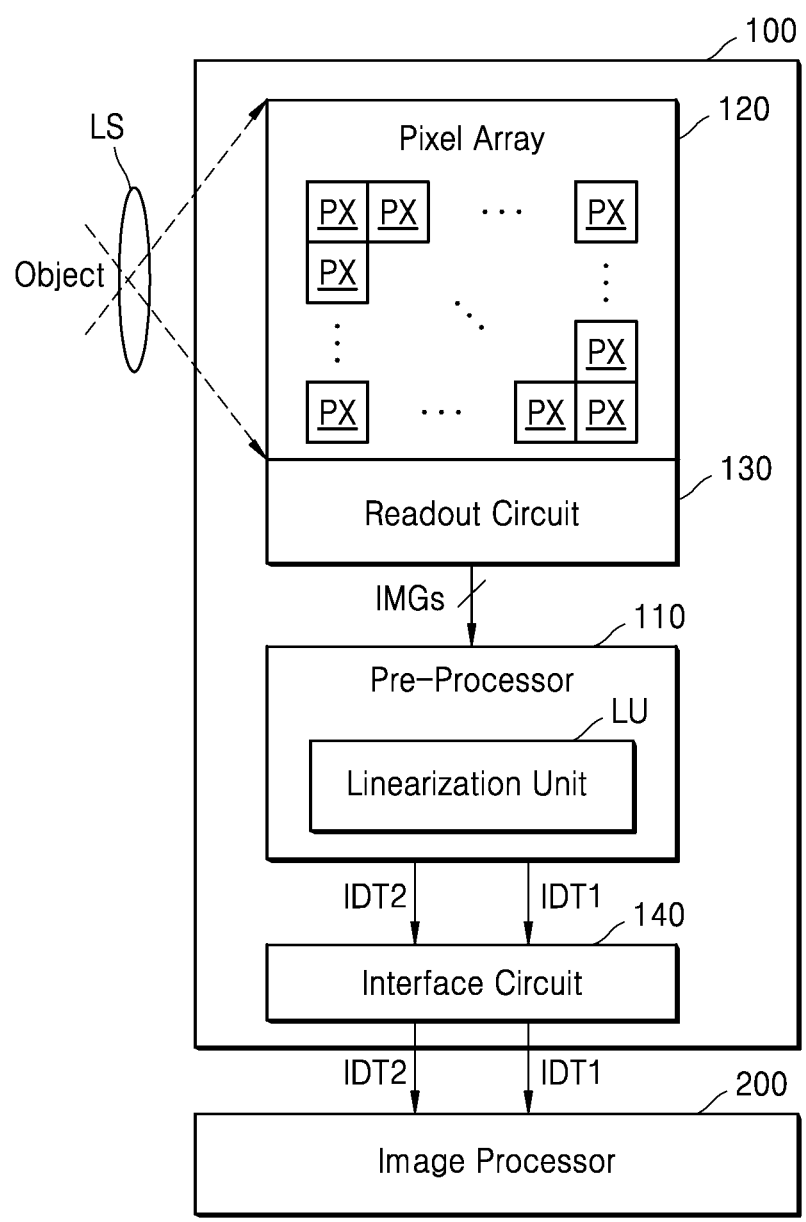
FIG. 2 is a block diagram schematically illustrating an image sensor according to an embodiment.

FIG. 2 is a block diagram schematically illustrating an image sensor according to an embodiment.

Referring to FIG. 2, the image sensor 100 may include a pixel array 120, a readout circuit 130, the pre-processor 110, and an interface circuit 140. The pixel array 120 and the readout circuit 130 may be referred to as a sensing unit. The image sensor 100 may further include other components for driving the pixel array 120, such as a row decoder, a timing controller, and a ramp signal generator. The image sensor 100 may be implemented by one or more chips (for example, semiconductor chips), the sensing unit (for example, the pixel array 120 and the readout circuit 130) may be disposed on a first chip, and the pre-processor 110 may be disposed on a second chip. In another embodiment, the pixel array 120 may be disposed on the first chip, and the reading unit 130 and the pre-processor 110 may be disposed on the second chip. The first chip and the second chip may be stacked. The first chip may further include a memory. The memory may include DRAM (Dynamic Random Access Memory) or MRAM (Magnetic RAM)

The pixel array 120 may be implemented as, for example, a transmission element such as a charge coupled device (CCD) or a complementary metal oxide semiconductor (CMOS). In addition, the pixel array 120 may be implemented by various types of transmission elements. The pixel array 120 may include a plurality of pixels PX that convert a optical signal (light) incident thereon into an electrical signal. The plurality of pixels PX may be arranged in a matrix such that the pixel array may have a resolution. Each of the plurality of pixels PX includes a photosensitive element (or referred to as a photoelectric conversion element). For example, the photosensitive element may include a photo diode, a photo transistor, a port gate or a pinned photodiode, or the like. The plurality of pixels PX may be driven in a line unit (or a row unit) and may output a sensing signal in a column unit. The plurality of pixels PX may be respectively connected to a plurality of column lines, and may output electrical signals to the readout circuit 130 through the plurality of column lines. Each of the plurality of pixels PX may sense light in a particular spectral rang. For example, the pixel array 110 may include a red pixel for converting light in a red spectral range into an electrical signal, a green pixel for converting light in a green spectral range into an electrical signal, and a blue pixel for converting light in a blue spectral range into an electrical signal. A color filter for transmitting light in a particular spectral range may be arranged over each of the plurality of pixels PX. However, the inventive concept is not limited thereto, and the pixel array 110 may further include a white pixel. In another embodiment, the pixel array 110 may include pixels of different types of color combinations, for example, a yellow pixel, a cyan pixel and a green pixel.

The readout circuit 130 may convert the electrical signals received from the pixel array 110 into an image and output the image. The readout circuit 130 may amplify the electrical signals and analog-to-digital convert the amplified electrical signals. The image generated by the readout circuit 130 may include a pixel value corresponding to each of the pixels PX of the pixel array 120.

The readout circuit 130 may generate a plurality of images IMGs having different luminances and output the plurality of images IMGs in the row unit. As described with reference to FIG. 1, the plurality of images IMGs may be multiple exposure images generated based on signals obtained according to different exposure times in the pixel array 110 or may be generated by adjusting the number of photoelectric conversion elements provided in the pixels PX. However, the embodiment is not limited thereto, and the plurality of images IMGs having different luminances may be generated by various driving methods with respect to the pixel array 110 and a read operation of the readout circuit 130. Hereinafter, for convenience of description, the plurality of images IMGs are multiple exposure images.

In an embodiment, the readout circuit 130 may output the plurality of images IMGs to the pre-processor 110 in a time division manner (or a staggered manner), simultaneously or sequentially.

As described with reference to FIG. 1, the pre-processor 110 may generate one merged image by performing pre-processing. For example, the pre-processor 110 may perform linearization processing on some images of the plurality of images IMGs. In an embodiment, the plurality of images IMGs may be stored in the memory, and some images of the plurality of images IMGs may be merged. Also, the pre-processor 110 may perform signal processing for adjusting a pixel value for each of the plurality of images IMGs. For example, signal processing may include at least one of black level compensation, lens shading compensation, cross talk compensation, and bad pixel correction. At least one of the plurality of images IMGs may be an image obtained from white pixels or yellow pixels, and the remaining image of the plurality of images IMGs may be an image obtained from any one of red pixels, green pixel, and blue pixels.

The pre-processor 110 may include a linearization unit LU that may perform linearization processing on n images (n is a positive integer equal to or greater than 2 and less than k) among received k images (k is a positive integer equal to or greater than 3) to generate one merged image. The pre-processor 110 may output the merged image as the first image data IDT1 and remaining k−n images on which linearization processing is not performed as the second image data IDT2 to the interface circuit 140. The remaining k−n images may be subjected to the above-described signal processing and output to the interface circuit 140.

The interface circuit 140 is a data and communication interface between the image sensor 100 and the image processor 200, and may transmit the first image data IDT1 and the second image data IDT2 to the image processor 200. The interface circuit 140 may communicate with the image processor 200 according to one of various communication and protocol methods such as a mobile industry processor interface (MIPI), an embedded display port (eDP) interface, a universal asynchronous receiver transmitter (UART) interface, an inter integrated circuit (I2C) interface, a serial peripheral interface (SPI), and the like.

Figure 3:
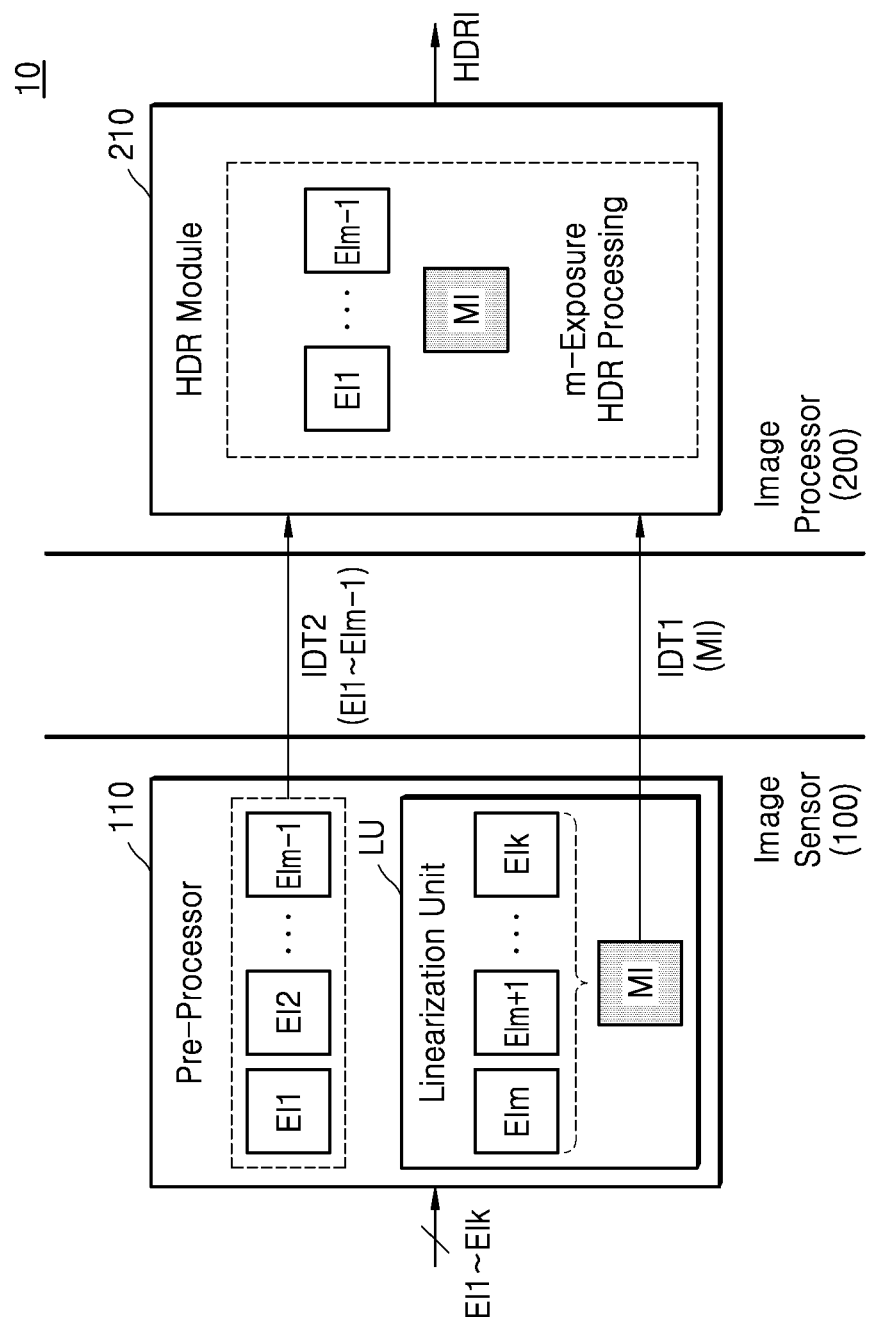
FIG. 3 is a diagram illustrating an operation of an image sensor and an image processor of an image processing system according to an embodiment.

FIG. 3 is a diagram illustrating an operation of the image sensor and the image processor of the image processing system according to an embodiment.

FIG. 3 illustrates a method, performed by the pre-processor 110 of the image sensor 100 and the HDR module 210 of the image processor 200, of performing HDR processing on a plurality of images having different luminances. Hereinafter, expressions such as "first," "second," and the like are used to label a component, and the expressions are used only to distinguish the component from other components, and do not limit the order and/or importance of the components.

Referring to FIG. 3, the HDR module 210 included in the image processor 200 may perform HDR processing on m images and generate the HDR image HDRI based on the m images.

The image sensor 100 may generate k images, in which k is greater than m, for example, first to kth exposure images EI1 to EIk having different luminances. The pre-processor 110 may receive the first to kth exposure images EI1 to EIk. The pre-processor 110 may perform signal processing, for example, black level compensation, lens shading compensation, cross talk compensation, and bad pixel correction, on the first to kth exposure images EI1 to EIk. The linearization unit LU of the pre-processor 110 may perform linearization processing on mth to kth exposure images EIm to EIk excluding m−1 exposure images (e.g., the first to m−1th exposure images EI1 to EIm−1) among the first to kth exposure images EI1 to EIk. The pre-processor 110 may generate a merged image MI as a result of linearization processing.

The merged image MI and the first to m-th exposure images EI1 to EIM−1 may be transmitted to the image processor 200 as the first image data IDT1 and the second image data IDT2, respectively. As described with reference to FIG. 2, the interface circuit 140 of FIG. 2 may transmit the first image data IDT1 and the second image data IDT2 to the image processor 200.

The HDR module 210 of the image processor 200 may perform HDR processing on the m image, i.e., the merged image MI and the first to m-th exposure images EI1 to EIM−1 included in the first image data IDT1 and the second image data IDT2. The HDR module 210 may perform linearization processing on the m images and perform DRC processing on the merged image MI generated according to the linearization processing. Accordingly, the HDR image HDRI may be generated. Although the HDR module 210 performs HDR processing on the m images, because the pre-processor 110 of the image sensor 100 performs previously linearization processing on the n images, i.e. the mth to kth exposure images EIm to EIK, the HDR image HDRI may have the same or similar dynamic range and SNR as the k exposure images, that is, the first to m-th exposure images EI1 to EIm−1 on which HDR processing is performed.

Figure 4A:
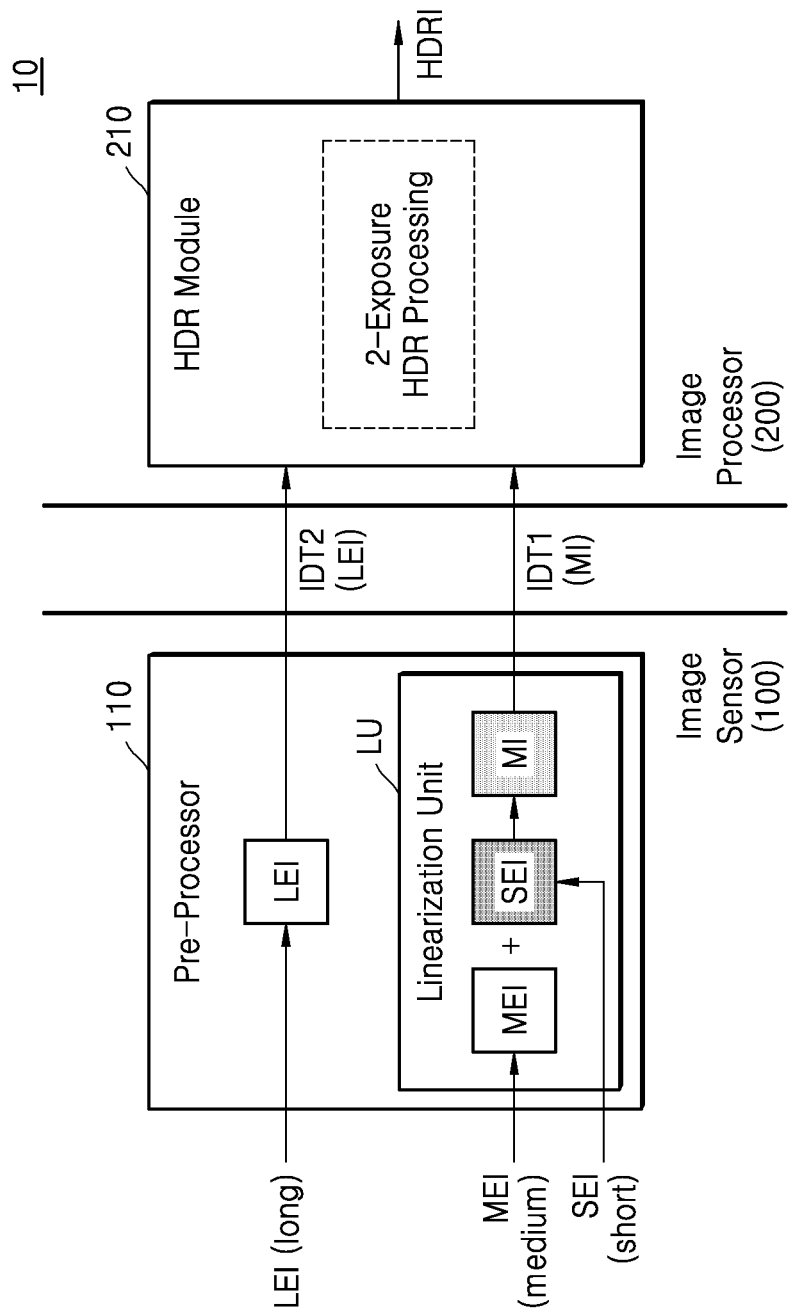
FIGS. 4A and 4B illustrate examples of an operation of an image sensor and an image processor of an image processing system according to an embodiment.
Figure 4B:
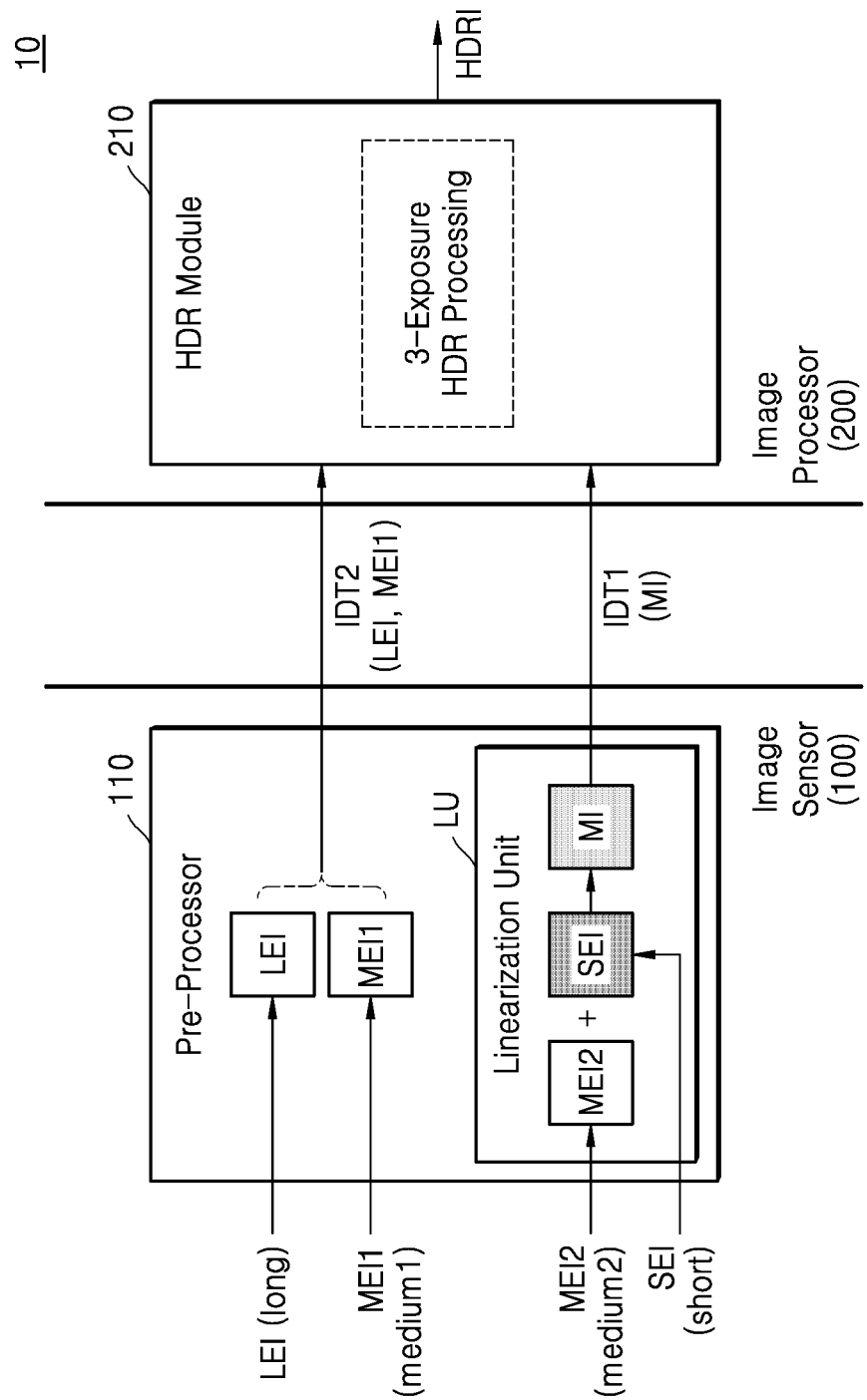

FIGS. 4A and 4B illustrate examples of an operation of the image sensor and the image processor of the image processing system according to an embodiment.

Referring to FIG. 4A, the image sensor 100 may generate three exposure images, for example, a long exposure image LEI, a medium exposure image MEI, and a short exposure image SE. The long exposure image LEI may be generated based on a longest exposure time from among an exposure time of the long exposure image LEI, an exposure time of the medium exposure image MEI, and an exposure time of the short exposure image SEI. Similarly, and the short exposure image SEI may be generated based on the shortest exposure time from among an exposure time of the long exposure image LEI, an exposure time of the medium exposure image MEI, and an exposure time of the short exposure image SEI. And, the medium exposure image MEI may be generated based on an intermediate exposure time from among an exposure time of the long exposure image LEI, an exposure time of the medium exposure image MEI, and an exposure time of the short exposure image SEI.

The pre-processor 110 may receive the long exposure image LEI, the medium exposure image MEI, and the short exposure image SEI, and may perform signal processing on the long exposure image LEI, the medium exposure image MEI, and the short exposure image SEI. The linearization unit LU included in the pre-processor 110 may generate the merged image MI by performing linearization processing on the medium exposure image MEI and the short exposure image SE. The image sensor 100 may transmit the merged image MI as the first data IDT1 and the long exposure image LEI as the second data IDT2 to the image processor 200.

The HDR module 210 of the image processor 200 may be configured to perform HDR processing on two images. The HDR module 210 may perform HDR processing, such as linearization processing and DRC processing, on the merged image MI and the long exposure image LEI that are received as the first data IDT1 and the second data IDT2, respectively. As a result, the HDR image HDRI generated according to HDR processing of the HDR module 210 may have a dynamic range and an SNR according to HDR processing performed on three exposure images.

Referring to FIG. 4B, the image sensor 100 may generate four exposure images, for example, a long exposure image LEI, a first medium exposure image MEI1, a second medium exposure image MEI2, and a short exposure image SE. The long exposure image LEI may be generated based on the longest exposure time from among an exposure time of the long exposure image LEI, an exposure time of the first medium exposure image MEI1, an exposure time of the second medium exposure image MEI2, and an exposure time of the short exposure image SE. Similarly, the short exposure image SEI may be generated based on the shortest exposure time from among an exposure time of the long exposure image LEI, an exposure time of the first medium exposure image MEI1, an exposure time of the second medium exposure image MEI2, and an exposure time of the short exposure image SEI. And, the first medium exposure image MEI1 may be generated based on a relatively longer exposure time than the exposure time of the second medium exposure image MEI2.

The pre-processor 110 may receive the long exposure image LEI, the first medium exposure image MEI1, the second medium exposure image MEI2, and the short exposure image SEI, and perform signal processing on the long exposure image LEI, the first medium exposure image MEI1, the second medium exposure image MEI2, and the short exposure image SE. The linearization unit LU included in the pre-processor 110 may generate the merged image MI by performing linearization processing on the second medium exposure image MEI2 and the short exposure image SE. The image sensor 100 may transmit the merged image MI as the first data IDT1 and the long exposure image LEI and the first medium exposure image MEI1 as the second data IDT2 to the image processor 200.

The HDR module 210 of the image processor 200 may be configured to perform HDR processing on three images. The HDR module 210 may perform HDR processing, for example, linearization processing and DRC processing, on the merged image MI, the long exposure image LEI, and the first medium exposure image MEI1 that are received as the first data IDT1 and the second data IDT2, respectively. As a result, the HDR image HDRI generated according to HDR processing of the HDR module 210 may have a dynamic range and an SNR according to HDR processing performed on four exposure images.

Figure 5A:
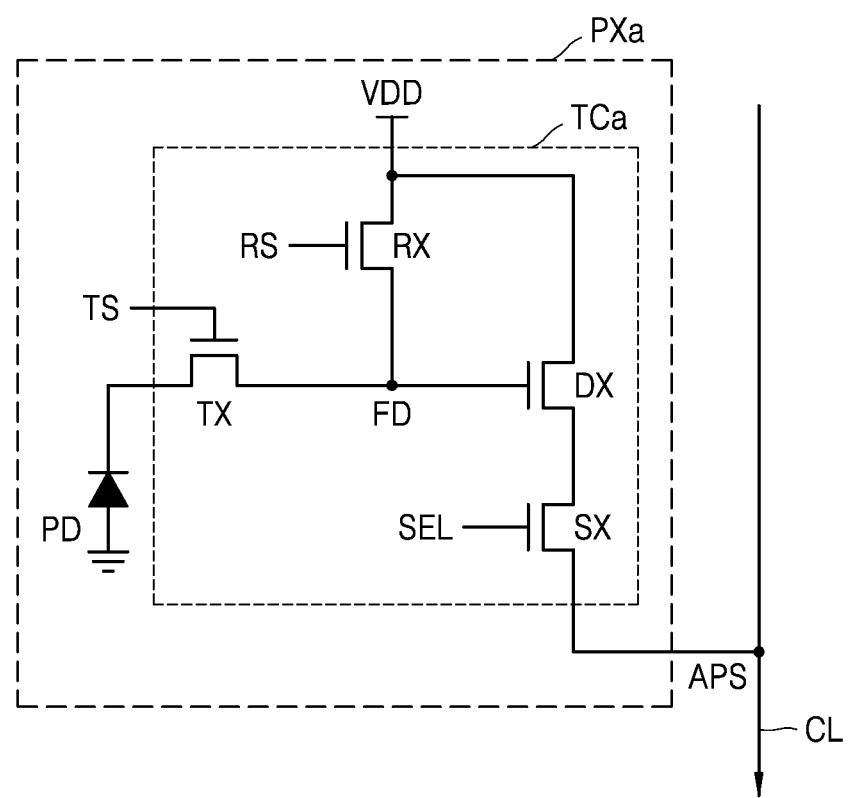
FIGS. 5A and 5B are circuit diagrams illustrating implementations of pixels according to an embodiment.
Figure 5B:
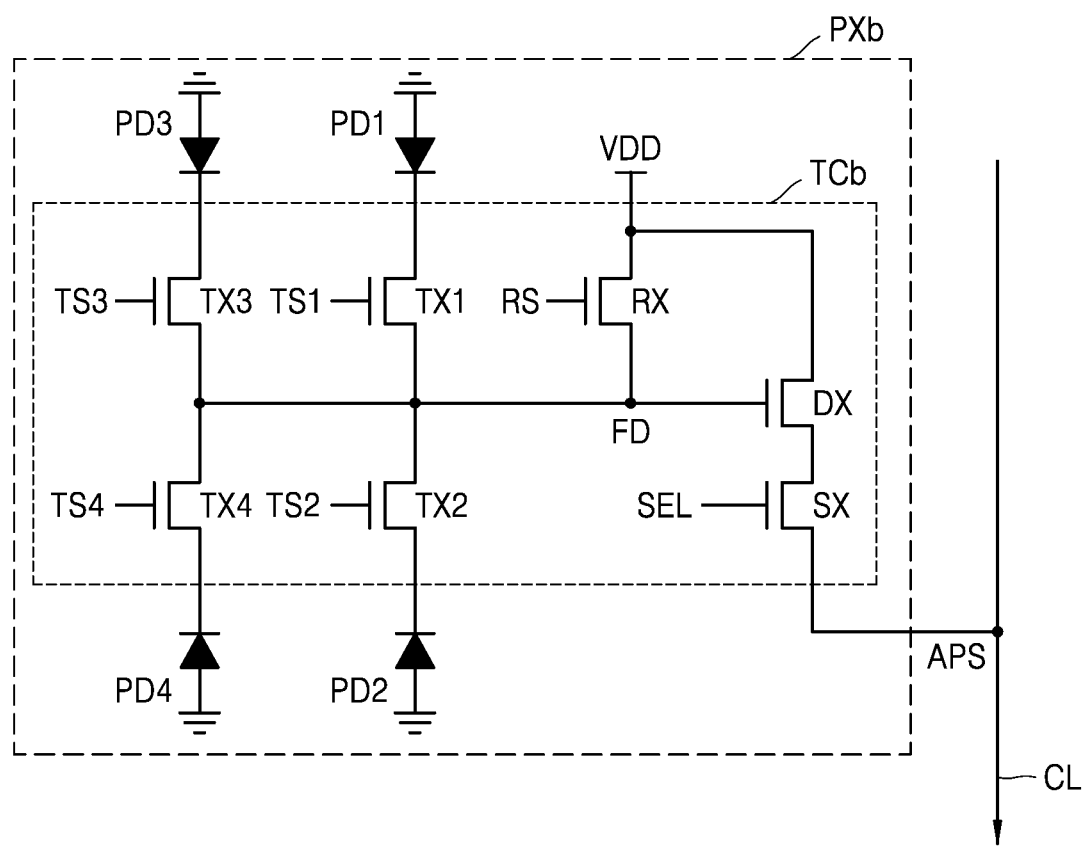

FIGS. 5A and 5B are circuit diagrams illustrating implementations of pixels according to an embodiment.

Referring to FIG. 5A, the pixel PXa may include a photodiode PD and a transmission circuit TCa. The photodiode PD may be implemented with another photosensitive element. The transmission circuit TCa may include a reset transistor RX, a transmission transistor TX, a driving transistor DX, and a selection transistor SX. However, the structure of the transmission circuit TCa is not limited thereto, and the structure of the transmission circuit TCa may vary according to implementation.

The photodiode PD may generate photocharges that vary according to the intensity of incident light. The transmission circuit TCa may generate an analog pixel signal APS corresponding to the photodiode PD or internal reset noise.

The transmission circuit TCa may operate based on received control signals SEL, RS, and TS. The transmission transistor TX may transmit photocharges from the photodiode PD to a floating diffusion node FD according to the transmission control signal TS. The driving transistor DX may amplify and output photocharges through the selection transistor SX according to the potential of the photocharges accumulated in the floating diffusion node FD. When the selection transistor SX is turned on in response to the selection control signal SEL, a sensing signal corresponding to the voltage level of the floating diffusion node FD, that is, a light sensing signal, may be output as an analog pixel signal APS, for example, a pixel voltage.

Meanwhile, the reset transistor RX may reset the floating diffusion node FD based on a power supply voltage VDD according to the reset control signal RS. In this regard, a reset signal corresponding to the voltage level of the floating diffusion node FD, for example, a noise signal, may be output as the analog pixel signal APS.

The analog pixel signal APS may be output to the readout circuit 130 (of FIG. 2) through a column line CL.

Referring to FIG. 5B, the pixel PXb may include a plurality of photodiodes, for example, first to fourth photodiodes PD1 to PD4 and a transmission circuit TCb. The transmission circuit TCb may include the reset transistor RX, the driving transistor DX, the selection transistor SX, and a plurality of transmission transistors TX respectively corresponding to the plurality of photodiodes, for example, first to fourth transmission transistors TX1 to TX4. The operation of the transmission circuit TCb of FIG. 5B is similar to the operation of the transmission circuit TCa of FIG. 5A. However, in FIG. 5B, the first to fourth transmission transistors TX1 to TX4 may respectively transmit photocharges from the corresponding photodiodes PD1 to PD4 to the floating diffusion node FD in response to one of the corresponding transmission control signals, for example, first to fourth transmission control signals TS1 to TS4.

In an embodiment, an image of different luminance may be generated from the pixel array (110 of FIG. 2) according to the number of photodiodes used in generating the sensing signal. For example, the first transmission transistor TX may be turned on in a first sensing period to generate a sensing signal according to the photocharges of the first photodiode PD1 when transmission control signal TS1 is active, the first and second transmission transistors TX1 and TX2 are turned on via transmission control signals TS1 and TS2 in a second sensing period to respectively generate sensing signals according to the photocharges of the first photodiode PD1 and the second photodiode PD2, and the first to third transmission transistors TX, TX2, and TX3 may be turned on via transmission control signals TS1, TS2, and TS3 in a third sensing period to generate sensing signals according to the photocharges of the first to third photodiodes PD1, PD2, and PD3. Therefore, images of different luminances may be generated in the first sensing period, the second sensing period, and the third sensing period. Of course, any combination of transmission transistors TS1 to TS4 may be activated in any number of various different periods to obtain images of different luminances.

Figure 6A:
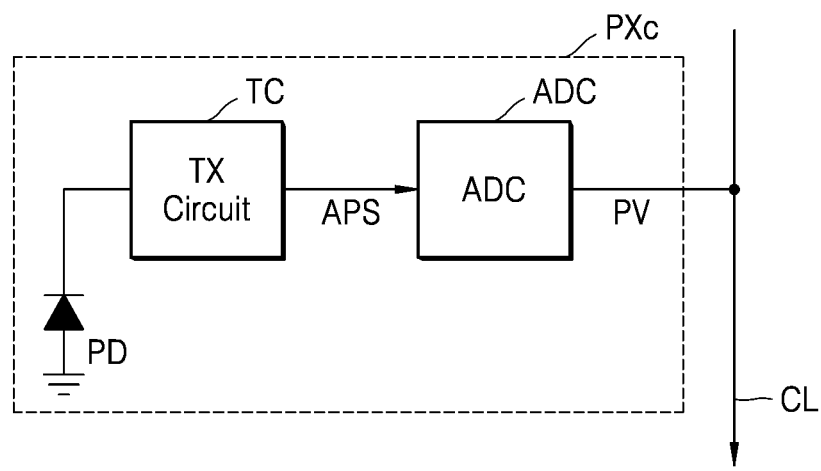
FIGS. 6A and 6B are circuit diagrams illustrating implementations of pixels according to an embodiment.
Figure 6B:
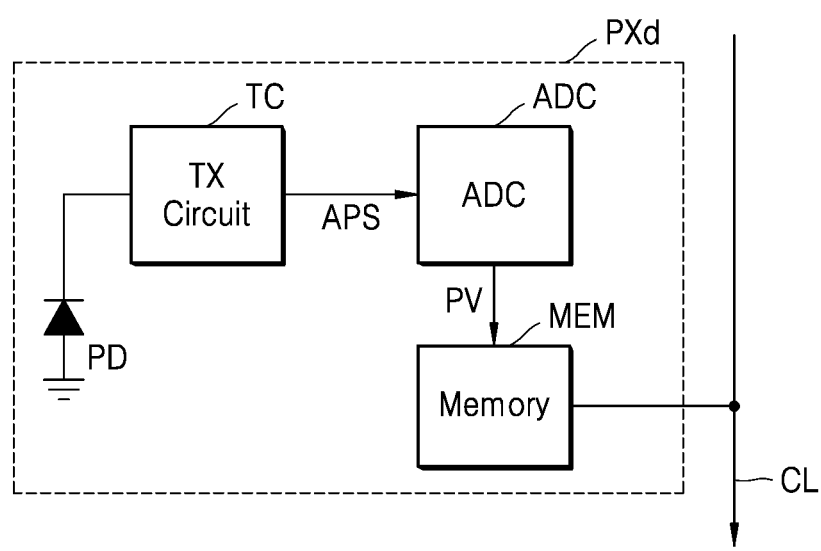

FIGS. 6A and 6B are circuit diagrams illustrating implementations of pixels according to an embodiment. FIGS. 6A and 6B illustrate digital pixels.

Referring to FIG. 6A, the pixel PXc may include the photodiode PD, the transmission circuit TC, and an analog-to-digital converter ADC. Although one photodiode PD is illustrated in FIG. 6A, the configuration is not limited thereto. As illustrated in FIG. 5B, the pixel PXc may include a plurality of photodiodes.

The transmission circuit TC may output the analog pixel signal APS according to the photocharge of the photodiode PD, and the transmission circuits TCa and TCb described with reference to FIGS. 5A and 5B may be applied.

The analog-to-digital converter ADC may convert the analog pixel signal APS into a pixel value PV which is a digital signal. The pixel value PV may be output to the readout circuit (130 of FIG. 2) through the column line CL. As shown in FIG. 6B, the pixel PXd may further include a memory MEM storing the pixel value PV that may be temporarily stored in the memory MEM, and then output to the readout circuit through the column line CL.

Figure 7A:
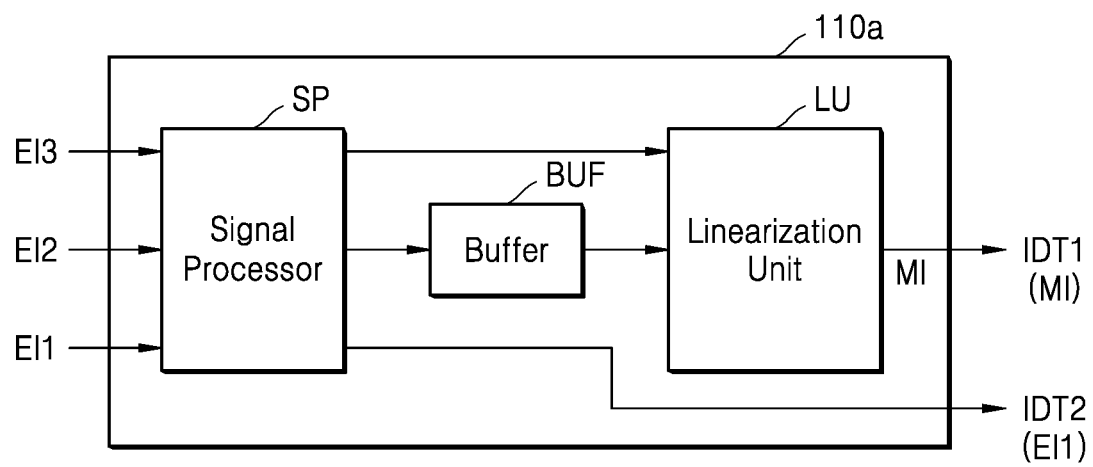
FIGS. 7A, 7B, and 7C are block diagrams schematically illustrating pre-processors according to an embodiment.
Figure 7B:
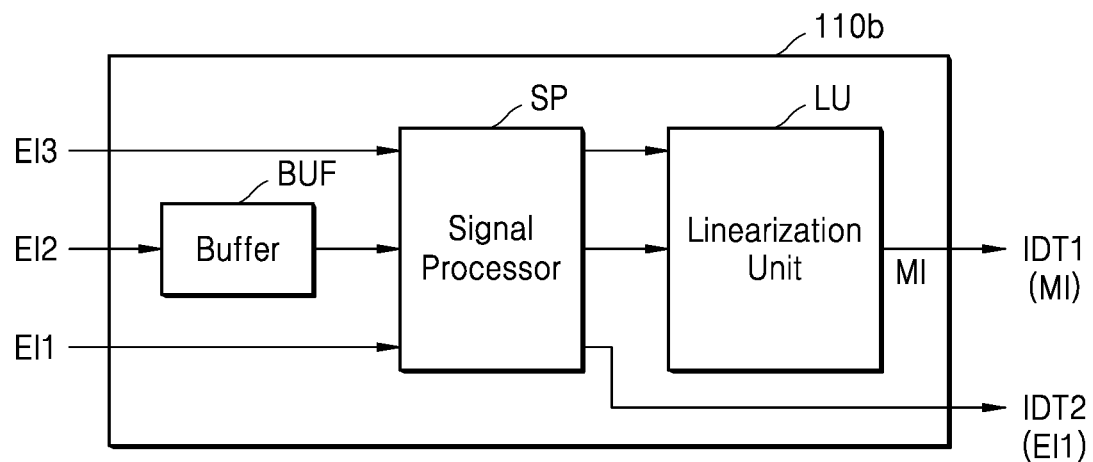
Figure 7C:
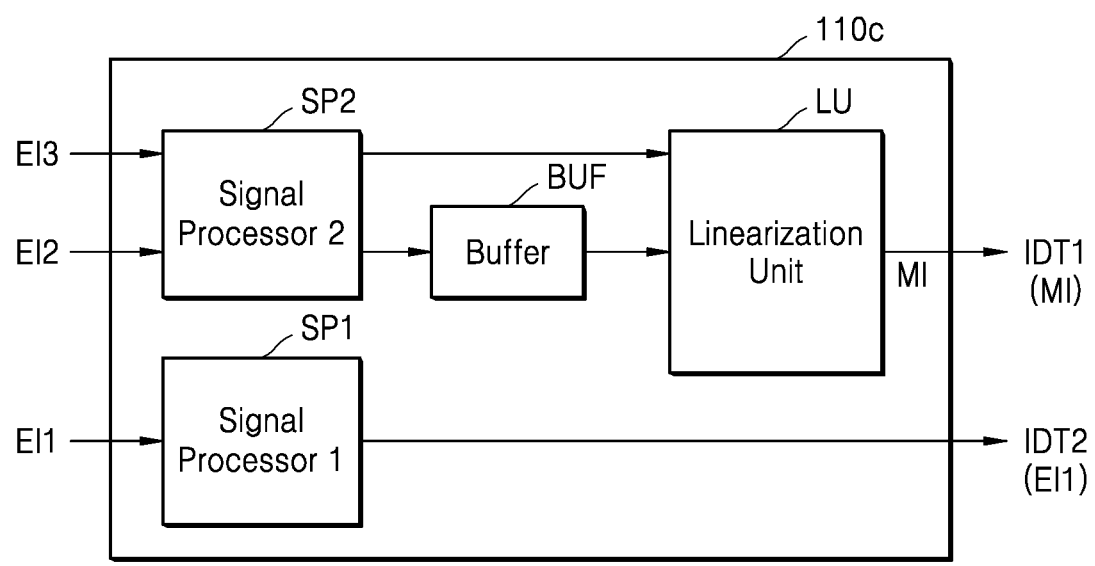

FIGS. 7A, 7B, and 7C are block diagrams schematically illustrating pre-processors according to an embodiment. For convenience of description, it is assumed that a plurality of images having different luminances, for example, the first to third exposure images EI1 to EI3, are received, an exposure time corresponding to the first exposure image EI1 is relatively longest, an exposure time corresponding to the third exposure image EI3 is relatively shortest, and an exposure time corresponding to the second exposure image EI3 is intermediate between the longest and shortest exposure times. For convenience of explanation, the first exposure image EI1, the second exposure image EI2, and the third exposure image EI3 may be identified as a long exposure image, a medium exposure image, and a short exposure image, respectively. The first exposure image EI1, the second exposure image EI2, and the third exposure image EI3 may be sequentially received.

Referring to FIG. 7A, the pre-processor 110a may include a signal processor SP, a buffer BUF, and the linearization unit LU.

The signal processor SP may perform signal processing for adjusting a pixel value with respect to each of the received images, for example, the first to third exposure images EI1 to EI3. The configuration and operation of the signal processor SP will be described with reference to FIG. 8.

The first exposure image EI1 on which signal processing is performed may be output as the second data IDT2. Linearization processing may be performed on the second exposure image EI2 and the third exposure image EI3 on which signal processing is performed.

The buffer BUF may temporarily store the second exposure image EI2 among the first to third exposure images EI1 to EI3 on which signal processing is performed. In an embodiment, the buffer BUF may be configured as a line buffer, and may store predetermined lines (specifically, pixel values corresponding to predetermined lines) of the received image. In an embodiment, the buffer BUF may be configured as a frame buffer, and may store all lines of the received image, that is, an image of one received frame.

Figure 8A:
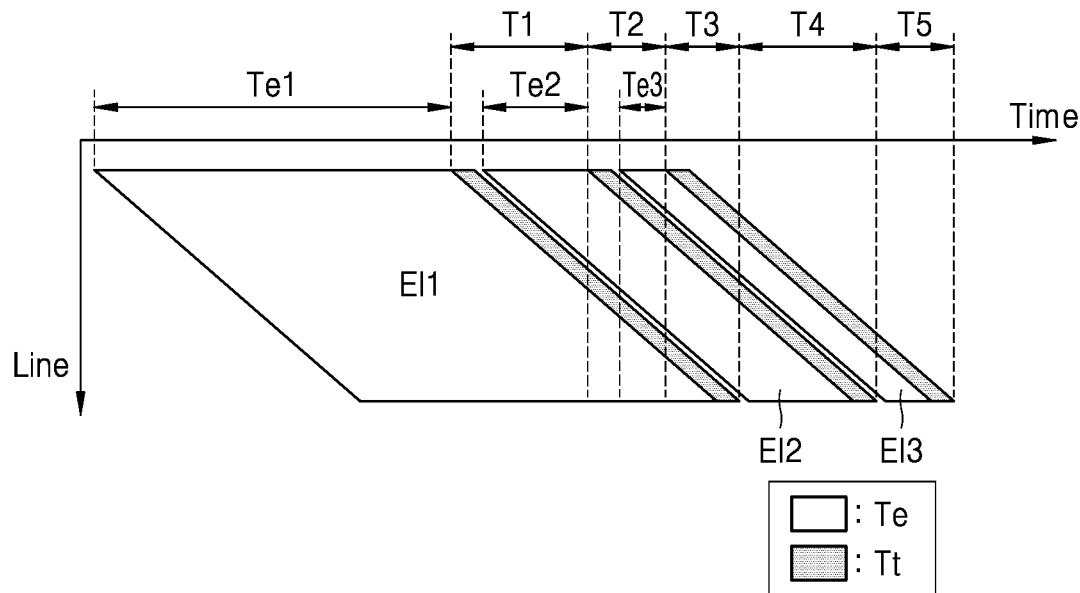
FIGS. 8A and 8B illustrate methods of generating and outputting a plurality of exposure images according to embodiments.

For example, a pixel unit (e.g., the pixel array (120 of FIG. 2) and the readout circuit (130 of FIG. 2) may output the first to third exposure images EI1 to EI3 in a staggered manner as shown in FIG. 8A and the pre-processor 110a may receive the exposure images. After predetermined lines of the second exposure image EI2 are received, a first line of the third exposure image EI3 may be received. Thereafter, lines of the second exposure image EI2 and lines of the third exposure image E3 may be alternately received. In this implementation, the buffer BUF may be configured as a line buffer and may store predetermined lines of the second exposure image EI2.

Figure 8B:
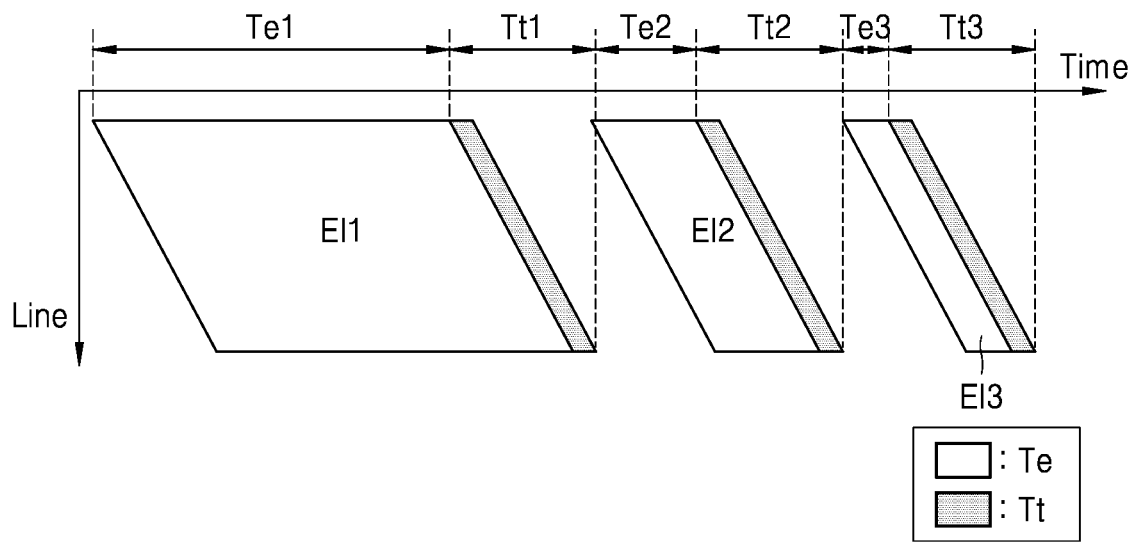

As another example, as illustrated in FIG. 8B, the pixel unit may output the first to third exposure images EI1 to EI3 in units of frames, and the pre-processor 110a may sequentially receive the first to third exposure images EI1 to EI3. For example, after the first exposure image EI1 is totally received in units of lines, the second exposure image EI2 may be wholly received in units of lines, and after the second exposure image EI2 is totally received, the third exposure image EI3 may be received in units of lines. In this regard, the buffer BUF may be configured as a frame buffer, and may store the second exposure image EI2.

The linearization unit LU may perform linearization processing on the second exposure image EI2 and the third exposure image EI3 on which signal processing is performed. For example, the linearization unit LU may perform linearization processing in units of lines of the second exposure image EI2 and the third exposure image EI3, and may generate a pixel value having a dynamic range increased based on pixel values corresponding to the same pixel of the second exposure image EI2 and the third exposure image EI3. Accordingly, the merged image MI may be generated and output as the first data IDT1.

The components and operations of the pre-processors 100b and 100c of FIGS. 7B and 7C are similar to the component and operation of the pre-processor 100a of FIG. 7A. However, referring to FIG. 7B, the buffer BUF may be disposed to receive the second exposure image EI2 instead of such image being received by the signal processor SP. After the received second exposure image EI2 is buffered in the buffer BUF, signal processing may be performed.

In addition, referring to FIG. 7C, the pre-processor 100c may include a first signal processing unit SP1 and a second signal processing unit SP2. The first signal processor SP1 may perform signal processing on the first exposed image EI1, and the second signal processor SP2 may perform signal processing on each of the second exposed image EI2 and the third exposed image EI3. Accordingly, signal processing may be performed in parallel by the signal processing unit SP1 and the signal processing unit SP2, and the signal processing may be independently controlled. The first exposure image EI1 on which signal processing is performed output from the first signal processor SP1 may be output as the second data IDT2. Linearization processing may be performed on the second exposure image EI2 and the third exposure image EI3 on which signal processing is performed output from the second signal processor SP2.

FIGS. 8A and 8B illustrate methods of generating and outputting a plurality of exposure images according to embodiments. In FIGS. 8A and 8B, the horizontal axis represents time and the vertical axis represents lines (or rows) of the pixel array (120 of FIG. 2).

During each exposure time Te from a first row to a last row of the pixel array, a photosensitive element of the pixel may receive an optical signal, and a sensing signal (an electrical signal) according to the optical signal may be received by the readout circuit 130 during a transmission time Tt. The readout circuit 130 may convert the sensing signal received in line units into a pixel value and output the pixel value. A first exposure image EI1 (e.g., a long exposure image) may be generated and output based on a first exposure time Te1, a second exposure image EI2 (e.g., a medium exposure image) may be generated and output based on a second exposure time Te2, and a third exposure image E3 (e.g., a short exposure image) may be generated and output based on a third exposure time Te3.

Referring to FIG. 8A, when the first exposure image EI1 is generated and output, the second exposure image E2 and the third exposure image EI3 may also be generated and output. In a first period T1, the first exposure image EI1 may be generated and output in units of lines, and in a second period T2, the first exposure image EI1 and the second exposure image E2 may be generated and output in units of lines. At this time, respective lines of the first exposure image EI1 and the second exposure image EI2 may be alternately output. In a third period T3, the first exposure image EI1, the second exposure image EI2, and the third exposure image EI3 may be generated and output. Respective lines of the first exposure image EI1, the second exposure image E2, and the third exposure image EI3 may be alternately output. In a fourth period T4, the second exposure image EI2 and the third exposure image E3 may be generated and output, and in a fifth period T5, the third exposure image E3 may be generated and output. As such, the manner in which a plurality of exposed images are simultaneously generated and output may be referred to as a staggered manner.

Meanwhile, referring to FIG. 8B, the first exposure image EI1 may be generated and output based on the first exposure time Te1, and then the second exposure image EI2 may be generated and output based on the second exposure time Te2. Finally, the third exposure image EI3 may be generated and output based on the third exposure time Te3. The first exposure image EI1 may be output in a first transmission period Tt1, the second exposure image E2 may be transmitted in a second transmission period Tt2, and the third exposure image E3 may be transmitted in a third transmission period Tt3. As such, a plurality of exposure images may be generated and output in units of frames.

Figure 9:
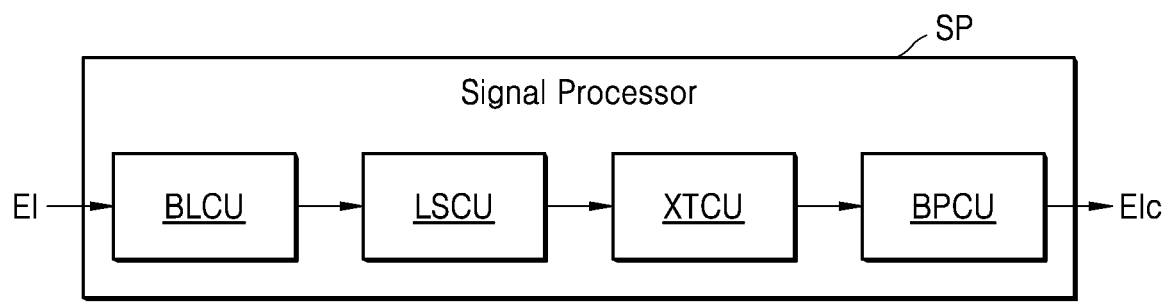
FIG. 9 is a block diagram schematically illustrating a signal processor according to an embodiment.

FIG. 9 is a block diagram schematically illustrating the signal processor according to an embodiment.

The signal processor SP may include a black level compensator BLCU, a lens shading compensator LSCU, a cross talk compensator XTCU, and a bad pixel compensator BPCU. The signal processor SP may further include other processing units.

The black level compensator BLCU may perform black level compensation on a received image, for example, the exposure image EL. A constant signal level may be detected due to a dark current, which is a current component that is unnecessarily generated by the manufacturing process of the image sensor 100 of FIG. 1 or an external environment. This signal level may be referred to as a black level corresponding to thermal noise and system noise. The black level compensator BLCU may perform black level compensation by removing an offset corresponding to the black value from a pixel value.

The lens shading compensator LSCU may remove vignetting due to lens shading by compensating for a luminance difference according to pixel positions corresponding to pixel values included in the received image.

The cross talk compensator XTCU may perform processing for removing cross talk with respect to the received image.

The bad pixel corrector BPCU may correct a defective pixel such as a dead pixel or a hot pixel that exists due to the manufacturing process. The bad pixel corrector BPCU may correct a pixel value corresponding to a bad pixel based on pixel values of pixels adjacent to the bad pixel, based on information about the bad pixel or a value of the bad pixel.

In FIG. 9, signal processing is performed in an order of black level compensation, lens shading compensation, cross talk compensation, and bad pixel correction, but the processing order is not limited thereto. The arrangement order of the black level compensator BLCU, the lens shading compensator LSCU, the cross talk compensator XTCU, and the bad pixel compensator BPCU may vary according to implementation.

Figure 10:
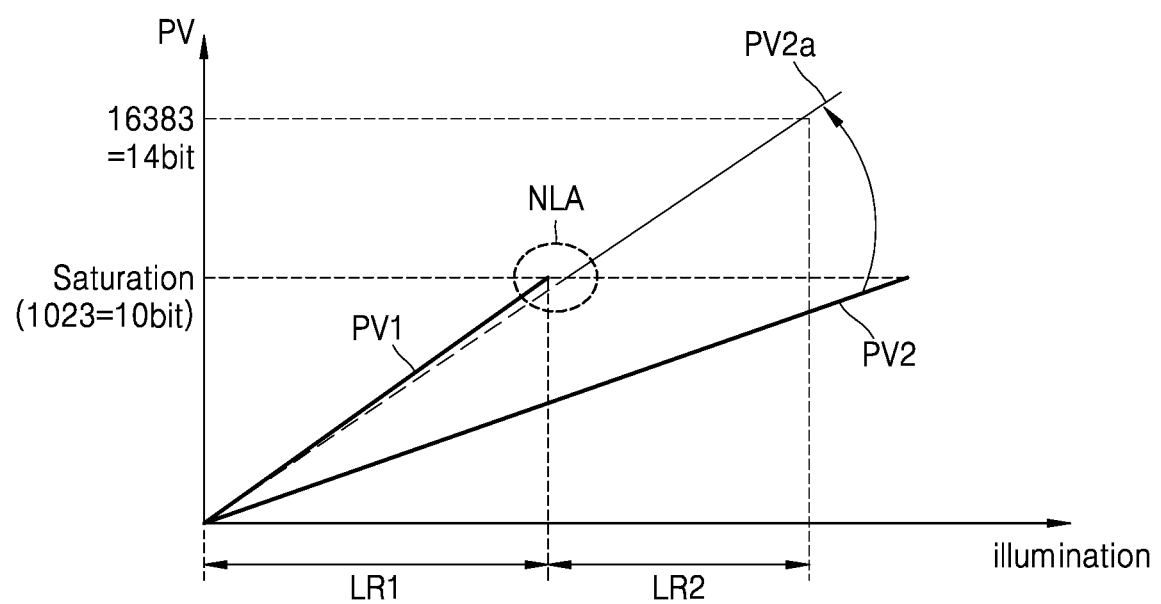
FIG. 10 is a graph illustrating linearization processing performed by a linearization unit according to an embodiment.

FIG. 10 is a graph illustrating linearization processing performed by a linearization unit according to an embodiment.

Referring to FIG. 10, a first pixel value PV1 and a second pixel value PV2 may represent pixel values of the same position or a similar position between the same images having different luminances (e.g., a high luminance image and a low luminance image, or a long exposure image and a short exposure image). The first pixel value PV1 represents a pixel value of the high luminance image, and the second pixel value PV2 represents a pixel value of the low luminance image. For example, the first pixel value PV1 may represent a pixel value of the long exposure image (or a medium exposure image) and the second pixel value PV2 may represent a pixel value of the short exposure image. A dynamic range may increase through linearization processing performed on the first pixel value PV1 and the second pixel value PV2.

The first pixel value PV1 corresponding to the pixel value of the high luminance image may be relatively higher than the second pixel value PV2 corresponding to the pixel value of the low luminance image. The second pixel value PV2 may have a low value in a first luminance region LR1 (e.g., a low luminance region) and may have a bad SNR characteristic. The first pixel value PV1 may have a relatively high value in the first luminance region LR1 and have a good SNR characteristic. Therefore, in the first luminance region LR1, the first pixel value PV1 may be selected as a pixel value of each pixel of a merged image.

Meanwhile, in a second luminance region LR2 (e.g., a high luminance region), the first pixel value PV1 may be saturated. For example, when the pixel value is represented by 10-bit data (expressed from 0 gray scale to 1023 gray scale), the first pixel value PV1 may be saturated in the second luminance region LR2 and have a value of 1023. Meanwhile, the second pixel value PV2 may increase linearly in the second luminance region LR2.

Therefore, in the second luminance region LR2, in order to accurately represent pixel values of the merged image, the second pixel value PV2 may be amplified and the amplified second pixel value PV2 may be selected as a pixel value of each pixel of the merged image. For example, when the ratio of an exposure time of the medium exposure image to an exposure time of the short exposure image is 16:1, the second pixel value PV2 may be amplified 16 times and the amplified second pixel value PV2a may be determined as the pixel value of the merged image.

Meanwhile, there may be a nonlinear period NLA in which pixel values do not continuously increase between the first luminance region LR1 in which the first pixel value PV1 is selected as the pixel value of the merged image and the second luminance region LR2 in which the amplified second pixel value PV2a is selected as the pixel value of the merged image. In the nonlinear period NLA, a more appropriate pixel value may be selected from the first pixel value PV1 and the amplified second pixel value PV2a, or arithmetic processing may be performed on the first pixel value PV1 and the amplified second pixel value PV2a and a value according to arithmetic processing may be output as a pixel value.

By linearization processing as described above, the dynamic range of the pixel value may increase, while the number of bits may increase to indicate the amplified second pixel value PV2a. For example, the pixel value may include 10-bit data before linearization processing is performed, and after linearization processing is performed, the pixel value may include 14-bit data and may exhibit a maximum of 16383 gray levels.

Figure 11:
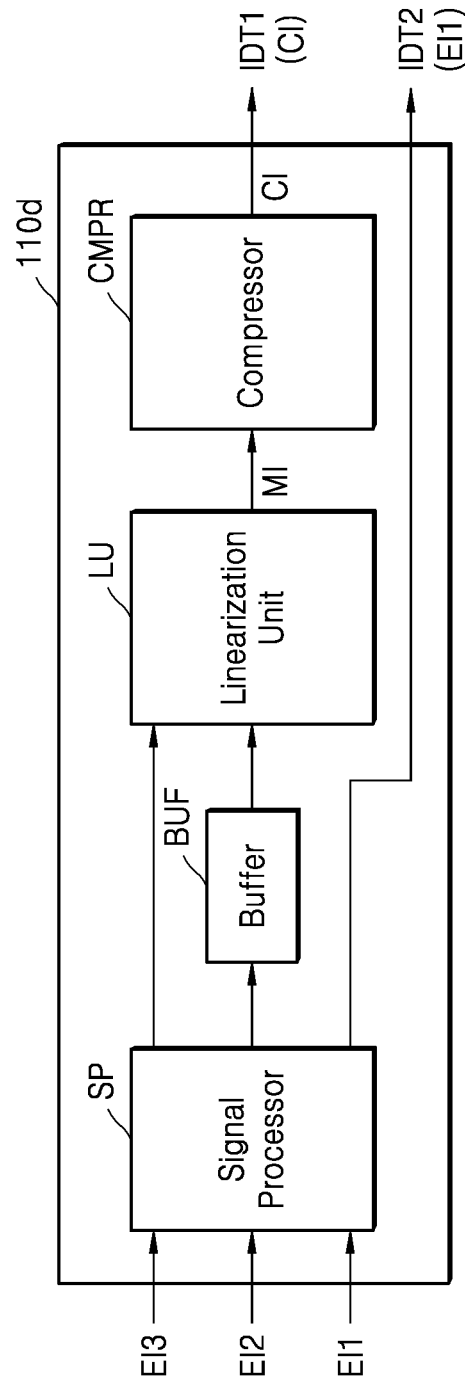
FIG. 11 is a block diagram schematically illustrating a pre-processor according to an embodiment.

FIG. 11 is a block diagram schematically illustrating a pre-processor according to an embodiment.

As illustrated with reference to FIG. 7A, the pre-processor 110d of FIG. 11 may include the signal processor SP, the buffer BUF, and the linearization unit LU. The pre-processor 110d may further include a compressor CMPR. As described with reference to FIG. 10, the merged image MI generated by performing linearization processing may increase the number of bits of a pixel value. The compressor CMPR may compress the merged image MI to generate a compressed image CI. The compressor CMPR may compress the merged image MI to match a transmission bandwidth of an image between the image sensor 100 (FIG. 1) and the processor 200 (FIG. 2), and the image sensor 100 may transmit the compressed image CI and remaining M−1 images to the processor 200. For example, the compressor CMPR may perform image compression to reduce the number of bits of the pixel value. The compressed image CI may be output as the first image data IDT1.

Figure 12:
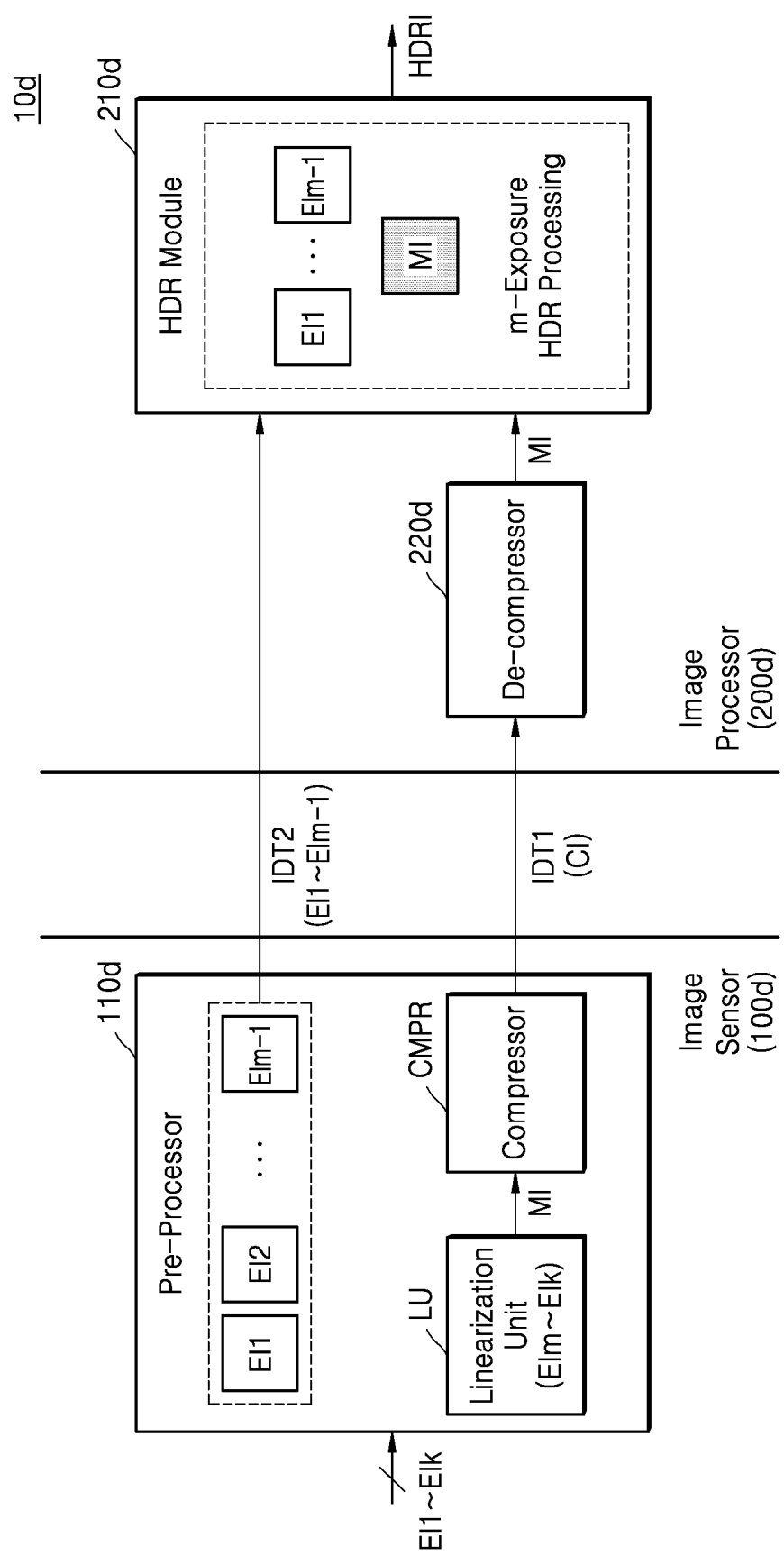
FIG. 12 is a diagram illustrating operations of an image sensor and an image processor of an image processing system according to an embodiment.

FIG. 12 is a diagram illustrating operations of an image sensor and an image processor of an image processing system according to an embodiment.

The operations of the image sensor 100d and the image processor 200d of FIG. 12 are similar to those of the image sensor 100 and the image processor 200 described with reference to FIG. 3.

However, in FIG. 12, the pre-processor 110d may further include the compressor CMPR to compress the merged image MI and generate the compressed image CI. The compressed image CI may be transmitted to the image processor 200d as first image data IDT1.

For example, when a transmission bandwidth of an image between the transmission bandwidth of an image between the image sensor 100d and the image processor 200d is suitable for the transmission of an image including pixel values of 10 bits or less, and a pixel value of the merged image MI has the number of bits exceeding 10 bits, the compressor 140 may generate the compressed image CI by compressing the merged image MI such that the pixel value does not exceed 10 bits.

The image processor 200d may further include a de-compressor 220d, and the de-compressor 220d may decompress the compressed image CI to reconstruct the merged image MI. An HDR module 210d may perform HDR processing on the merged image MI and the first to m−1 exposure images EI1 to EIm−1 included in the second image data IDT2. The HDR module 210d may perform linearization processing on m images and perform DRC processing on a merged image generated according to linearization processing. Accordingly, the HDR image HDRI may be generated.

Figure 13:
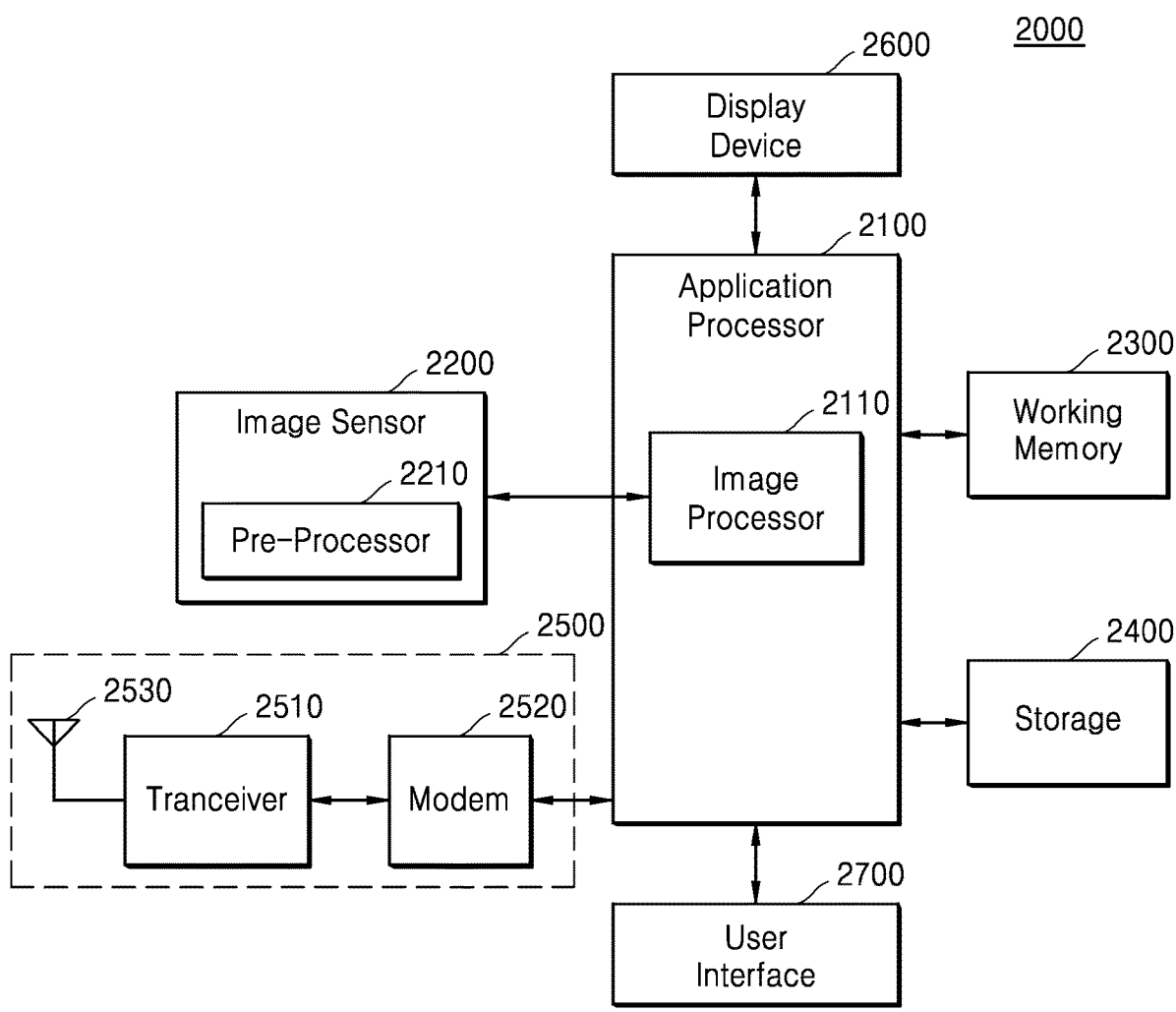
FIG. 13 is a block diagram illustrating an image processing system according to an embodiment of the present disclosure.

FIG. 13 is a block diagram illustrating an image processing system according to an embodiment. The image processing system 2000 of FIG. 13 may be implemented within a portable terminal such as a smart phone or tablet.

Referring to FIG. 13, the image processing system 2000 may include an application processor 2100, an image sensor 2200, a working memory 2300, a storage 2400, a display device 2600, a user interface 2700, and wireless transmitter/receiver (transceiver) 2500.

The application processor 2100 may be implemented as a system on chip (SoC) that controls the overall operation of the image processing system 2000 and controls execution of an application program, an operating system, and the like.

The application processor 2100 may provide image data provided from the image sensor 2200 to the display device 2600 or store the image data in the storage 2400. The application processor 2100 may include an image processor 2110. The image processor 2110 may perform image processing, such as image quality adjustment and data format change, on the image data received from the image sensor 2200. The image processor described with reference to FIGS. 1 through 12 may be applied as the image processor 2110.

The image sensor described with reference to FIGS. 1 through 12 may be applied as the image sensor 2200. The image sensor 2200 may include a pre-processor 2210, and the pre-processor 2210 may perform pre-processing including some processing operations of HDR processing on some of a plurality of images having different luminances and transmit an image merged by pre-processing and the remaining other images to the image processor 2110. The image processor 2110 of the application processor 2100 may generate an HDR image by performing HDR processing on the merged image and the other images received from the image sensor 2200.

The working memory 2300 may be implemented as a volatile memory such as DRAM or SRAM or a nonvolatile resistive memory such as FeRAM, RRAM, or PRAM. The working memory 200 may store programs and/or data processed or executed by the application processor 2100.

The storage 2400 may be implemented as a nonvolatile memory device such as NAND flash or resistive memory. For example, the storage 2400 may be provided as a memory card (e.g., MMC, eMMC, SD, micro SD), or the like. The storage 2400 may store the image data provided from the image sensor 2200.

The user interface 2700 may be implemented as various devices capable of receiving a user input, such as a keyboard, a curtain key panel, a touch panel, a fingerprint sensor, and a microphone. The user interface 2700 may receive the user input and provide a signal corresponding to the received user input to the application processor 2100.

The wireless transmitter/receiver 2500 may include a transceiver 2510, a modem 2520, and an antenna 2530.

While the concepts herein have been particularly shown and described with reference to embodiments thereof, it will be understood that various changes in form and details may be made therein without departing from the spirit and scope of the following claims.

What is claimed is:

1. An image processing system comprising:
   an image sensor comprising:
      a pixel array and a readout circuit configured to generate a first image of an object based on a first exposure time, a second image of the object based on a second exposure time, and a third image of the object based on a third exposure time, the first exposure time, the second exposure time, and the third exposure time being different from each other and the first image having a first luminance, the second image having a second luminance, and the third image having a third luminance, wherein the first luminance, the second luminance, and the third luminance are different from each other;
      a pre-processor configured to perform linearization processing on the first image and the second image to generate a merged image with an increased number of bits of a pixel value; and:

an interface circuit configured to output first image data based on the merged image and second image data based on the third image; and an image processor configured to receive the first image data and the second image data and generate a high dynamic range (HDR) image having an increased dynamic range based on the first image, the second image, and the third image using the first image data and the second image data.

2. The image processing system of claim 1, wherein the first exposure time and the second exposure time are shorter than the third exposure time.

3. The image processing system of claim 1, wherein the pre-processor is configured to perform image processing on the first image, the second image, and the third image, and to perform the linearization processing on the first image and the second image to generate the merged image.

4. The image processing system of claim 3, wherein the pre-processor further comprises:
a line buffer storing a plurality of pixel values corresponding to lines of the first image and the second image.

5. The image processing system of claim 4, wherein the pixel array and the readout circuit are further configured to output the first image, the second image, and the third image to the pre-processor according to a time division method in units of lines.

6. The image processing system of claim 1, wherein the pre-processor further comprises:
a frame buffer storing an image among the first image and the second image.

7. The image processing system of claim 1, wherein a first number of bits of a first pixel value of a pixel included in the merged image is greater than a second number of bits of a second pixel value of the pixel included in the third image.

8. The image processing system of claim 1, further comprising a compressor configured to compress the merged image to generate a compressed image,
wherein the interface circuit is configured to output the third image and the compressed image to the image processor.

9. The image processing system of claim 1, wherein the image processor is configured to perform linearization processing and dynamic range compression on the third image and the merged image.

10. An image processing system comprising:
an image sensor configured to generate a first image based on a first exposure time, a second image based on a second exposure time, and a third image based on a third exposure time, wherein the first exposure time, the second exposure time, and the third exposure time are different from each other, merge the first image and the second image to generate a merged image, output first image data based on the merged image and second image data based on the third image; and
an image processor configured to receive the first image data and the second image data and generate a high dynamic range (HDR) image having an increased dynamic range based on the first image, the second image, and the third image using the first image data and the second image data,
wherein the image sensor comprises a pre-processor configured to perform linearization processing on the first image and the second image to generate the merged image with an increased number of bits of a pixel value.

11. The image processing system of claim 10, wherein the image processor is configured to perform image processing on images for dynamic range extension.

12. The image processing system of claim 10, wherein the image sensor is further configured to compress the merged image to output a compressed image as the first image data, and
wherein the image processor is further configured to decompress the compressed image to reconstruct the merged image.

13. The image processing system of claim 10, wherein the image processor is further configured to output the HDR image as one frame of a preview image or a video.

14. An image processing system comprising:
an image sensor comprising
a pixel array configured to convert optical signals incident thereon into electrical signals based on different exposure times;
a readout circuit configured to generate a first exposure image having a first exposure time, a second exposure image having a second exposure time, and a third exposure image having a third exposure time based on the electrical signals, wherein the first exposure time is a longest exposure time among the first exposure time, the second exposure time, and the third exposure time, and wherein the third exposure time is a shortest exposure time among the first exposure time, the second exposure time, and the third exposure time;
a pre-processor configured to perform linearization processing to generate a merged image based on the second exposure image and the third exposure image, the merged image having an increased number of bits of a pixel value; and
an interface circuit configured to output first image data based on the merged image and second image data based on the first exposure image; and
an image processor configured to receive the first image data and the second image data and generate a high dynamic range (HDR) image having an increased dynamic range based on the first exposure image, the second exposure image, and the third exposure image using the first image data and the second image data.

15. The image processing system of claim 14, wherein the pre-processor comprises:
a signal processor configured to perform image processing to adjust pixel values of pixels of the first exposure image, the second exposure image, and the third exposure image;
a line buffer that stores a pixel value corresponding to a plurality of lines of the second exposure image received before receiving a first line of the third exposure image; and
a linearization processor configured to perform the linearization processing to increase a dynamic range by merging the second exposure image and the third exposure image.

16. The image processing system of claim 15, wherein the signal processor is further configured to perform image processing of at least one of black level compensation, lens shading compensation, crosstalk compensation, and bad pixel correction.

17. The image processing system of claim 15, wherein the readout circuit is configured to generate a fourth exposure image having a fourth exposure time, wherein the fourth exposure time is shorter than the first exposure time and longer than the second exposure time, and
wherein the interface circuit is configured to output the first exposure image, the fourth exposure image, and the merged image to the image processor.

18. The image processing system of claim 14, further comprising a compressor configured to perform image compression to reduce a number of bits of each pixel value of the merged image.

\* \* \* \* \*